United States Patent [19]

Clarke

[11] Patent Number: 4,699,476
[45] Date of Patent: Oct. 13, 1987

[54] PROJECTION LENS SYSTEM
[75] Inventor: John A. Clarke, Carshalton, England
[73] Assignee: U.S. Philips Corporation, New York, N.Y.
[21] Appl. No.: 807,379
[22] Filed: Dec. 10, 1985
[30] Foreign Application Priority Data
Dec. 14, 1984 [GB] United Kingdom ............... 8431616
[51] Int. Cl.$^4$ .................. G02B 13/18; G02B 9/34
[52] U.S. Cl. ................... 350/432; 350/412; 350/473
[58] Field of Search .............. 350/432, 412, 473
[56] References Cited
U.S. PATENT DOCUMENTS
4,577,935 3/1986 Yamakawa et al. ............. 350/412
4,603,950 8/1986 Uehara et al. .................. 350/412

Primary Examiner—John K. Corbin
Assistant Examiner—Rebecca D. Gass
Attorney, Agent, or Firm—F. Brice Faller

[57] ABSTRACT

A lens system is provided which is suitable for back-projecting an enlarged image of a TV cathode ray tube (CRT). To achieve a compact cabinet design 1 for such a projection television set, a short projection throw and a wide projection angle are required, together with a wide aperture (F/1) for a bright projected picture and with a definition which may need to be good enough to resolve 1249 line television pictures. The lens system comprises a CRT face plate FP which is either flat or has a relatively shallow curavature on one or both sides and four lens elements L1, L2, L3 and L4. L1 is a weak lens, L2 and L3 are each of positive power and L4 is a negative element close to the CRT. At least two of the element surfaces are aspheric. The powers of the elements are chosen so that $$-0.20K < K_1 < +0.10K$$

$$+0.60K < K_2 < +0.85K$$

$$+0.35K < K_3 < +0.55K$$

and $$-1.20K < K_4 < -0.90K$$

where $K_1$ is the power of the first low power element remote from the object surface, $K_2$ is the power of the second element, $K_3$ is the power of the third element and $K_4$ the power of the fourth element close to the CRT surface and K is the total power of the projection lens. Projection angles up to ±35 degrees are obtained.

7 Claims, 9 Drawing Figures

PROJECTION LENS SYSTEM

BACKGROUND OF THE INVENTION

This invention relates to projection lenses, and more particularly, relates to lenses designed to project an enlargement of an image on a cathode ray tube (CRT) such as a phosphor screen of a television set.

In projection television sets the image may be projected on to a translucent screen from the opposite side to the observer, the CRT and lens being behind the translucent screen and within a free standing cabinet, the front of which comprises the translucent screen. It is desirable to reduce the depth of the cabinet as much as possible and at least below a value such that the cabinet can easily pass through ordinary living room doors. Folding mirrors are usually used within the cabinet to reduce the depth. If the projection distance, that is the distance between lens and translucent screen, is reduced, then the number of internal mirrors can be reduced, but this means that the lens must project at larger field angles. Wide angle projection lenses, covering ±35 degrees or greater, are usually more complex that those for standard projection angles of about ±23 degrees.

In colour projection television systems using three cathode ray tubes each with its own lens, it is often not necessary to correct the chromatic aberration of each lens due to the limited spectral bandwidth of each CRT, thus simplifying the lens design to some extent. The use of aspheric surfaces on some lens elements can also reduce the number of elements in the lens. Such designs are disclosed in U.S. Pat. Nos. 4,300,817 and 4,348,081. However, the types of lenses shown in these specifications are not suitable for very wide angle projection systems as the optical performance at large field angles is too low, both as regards light transmission, and also resolution.

SUMMARY OF THE INVENTION

The aim of the present invention is to improve both the light transmission and also the resolution of wide angle lenses suitable for three tube colour projection television systems, using cathode ray tubes which have faceplates which are either flat or have a relatively shallow curvature on one or both sides. For lenses to be used with CRTs having steeply curved faceplates concave towards the lens see co-pending British Patent Application No. 8,431,615, to which U.S. application Ser. No. 807,385 corresponds.

The invention provides a lens system for projecting an enlarged image of an object surface onto a planar display screen, characterised in that the projection lens comprises first from the display screen a first element L1 of low power relates to the power of the whole lens and, in succession from the first element to the object surface, second, third and fourth elements L2, L3, and L4 respectively, L2 and L3 being of positive power and L4 being of negative power. The powers K1, K2, K3 and K4 of the respective elements are chosen relative to the power K of the whole lens so that $$-0.20K < K1 < +0.10K$$
$$+0.60K < K2 < +0.85K$$
$$+0.35K < K3 < +0.55K$$
$$-1.20K < K4 < -0.90K$$

and at least two of the element surfaces are aspheric. The relatively low power element and an adjacent aperture stop are placed in front of a system that superficially resembles that described in U.S. Pat. No. 4,348,081. The purpose of this arrangement is primarily to reduce the angles of incidence at surfaces near to the CRT of rays from extreme parts of the image on the CRT, as this reduces the aberrations contributed by these surfaces. The invention differs from U.S. Pat. No. 4,300,817 in that an essential requirement is that the relative power of this low power element is negative or zero, or if positive is less than 0.1 of the total power, whereas in the above quoted patent it has a positive power of at least 0.1 of the total power. An exception to this is for the case of a shallow convex surface on the inside of the CRT faceplate. Such a feature in not covered by the aforementioned patent.

For the case of a CRT faceplate that is flat on both sides, the ranges of K1, K2, K3 and K4 given apply directly.

For the case of a shallow convex surface on the inside of the CRT faceplate, less negative power is needed in the lens. This reduction in negative power may be made on either the first element L1 or the fourth element L4. Adjustment to the power of one of the elements is made as will be explained later.

Each of the lens elements may have spherical surfaces on both sides, or an aspherical surface on one side, or aspherical surfaces on both sides. A further feature is that element L4 may have air on both sides, or it may be in close contact with the CRT faceplate, or it may be separated from the CRT faceplate be a liquid medium which can also be used for cooling the CRT faceplate. In general, the liquid medium has substantially uniform thickness and is between two flat or similarly curved surfaces. As such it does not have significant optical power, and variations in thickness and refractive index of the liquid medium are possible without affecting the scope and spirit of this invention.

DETAILED DESCRIPTION OF THE INVENTION

Figure 1:
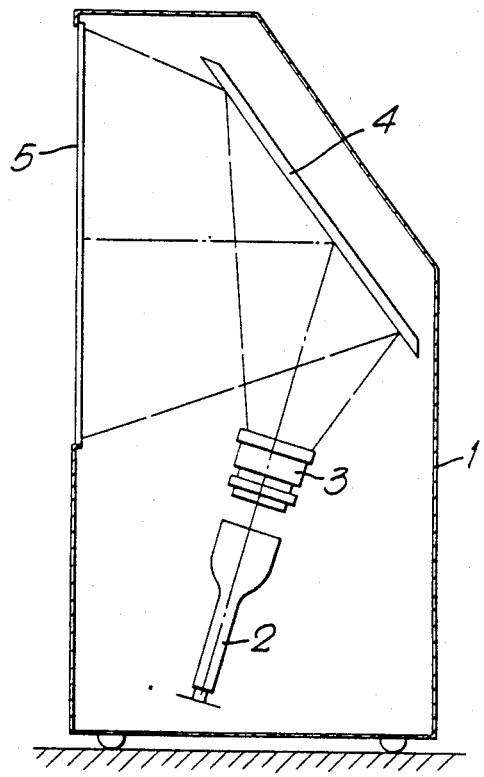
FIG. 1 shows a typical layout of a projection television system to which a wide angle lens system in accordance with the invention may be applied.

Referring to FIG. 1, a free standing cabinet 1 contains a back projection television display system comprising a cathode ray tube (CRT) 2, a projection lens 3, a front metallised mirror 4 to fold the optical path, and a translucent projection screen 5. Screen 5 may be a compound screen comprising a Fresnel lens and a light scattering component. For colour television, three CRTs and three lenses are used in line normal to the plane of the drawing, with the outer CRTs inclined inwards such that the three pictures projected are coincident with each other on the translucent screen 5.

Figure 2:
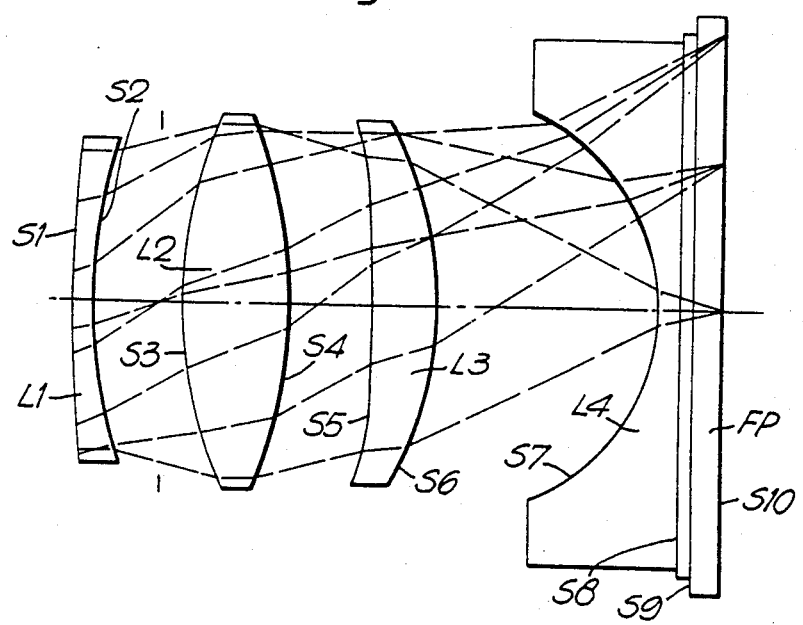
FIGS. 2 and 3 show lens systems with four elements of either glass or plastic, which are suitable for projection at angles up to ±35 degrees from a CRT with a flat faceplate.
Figure 3:
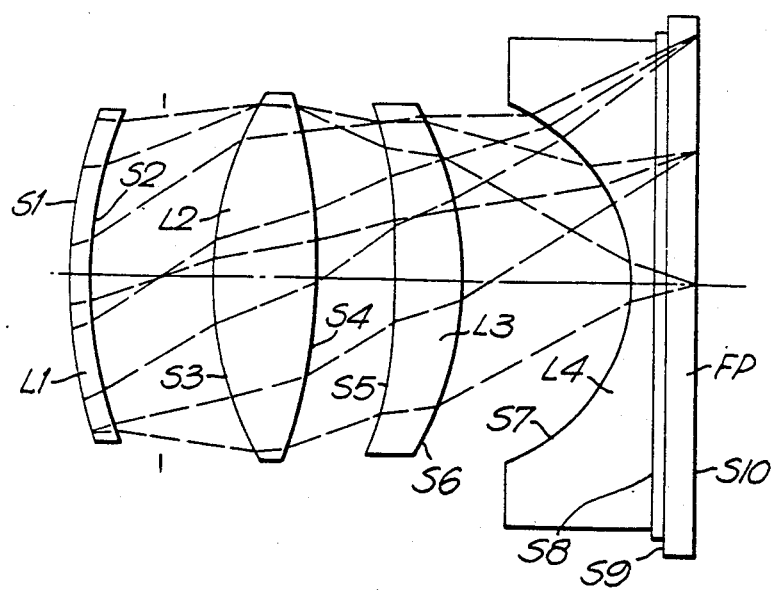
Figure 4:
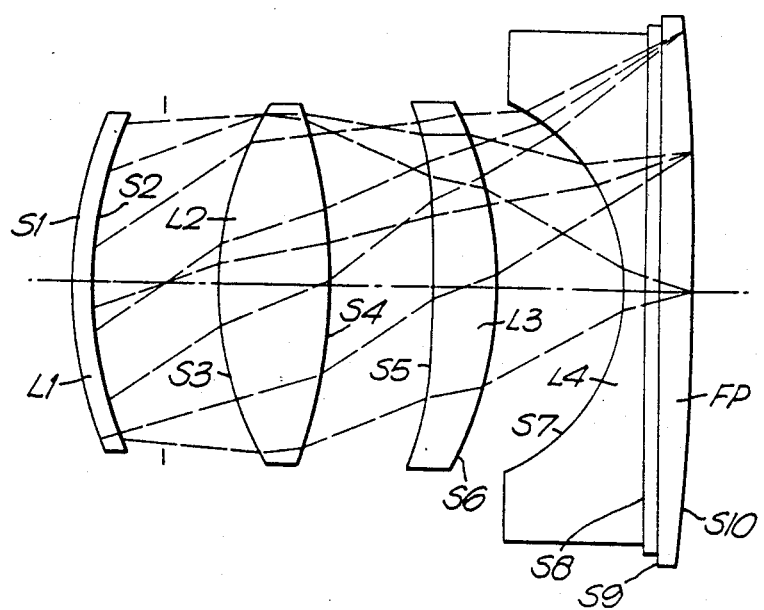
FIGS. 4 and 5 show lens systems with four elements of either glass or plastic, which are suitable for projection at angles up to ±35 degrees from a CRT with a faceplate which is flat on the outside and has a shallow convex curvature on the inside.
Figure 5:
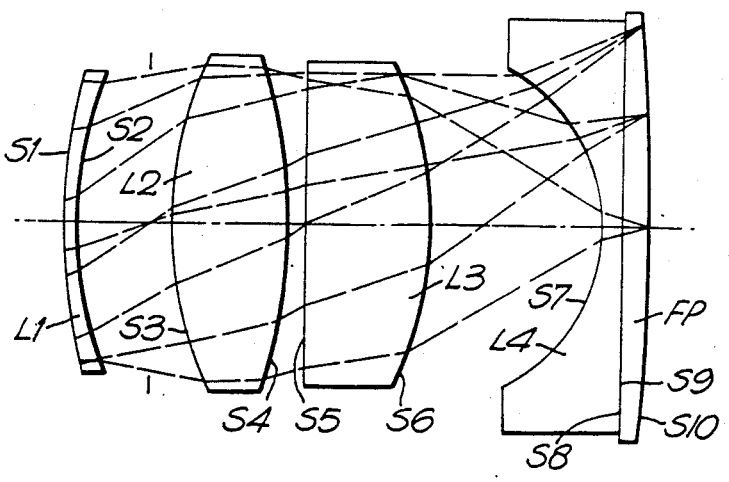
Figure 6:
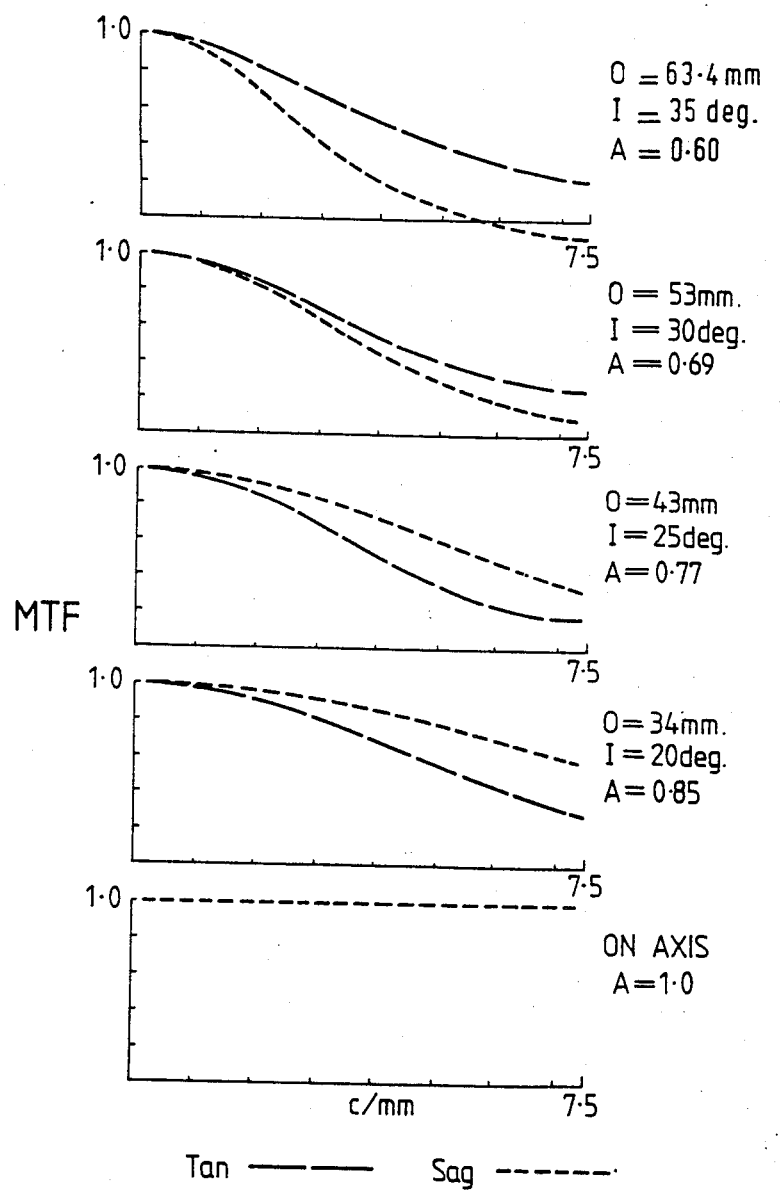
FIGS. 6 to 9 show the modulation transfer functions and relative illumination factors for the lens systems of FIGS. 2 to 5 respectively.
Figure 7:
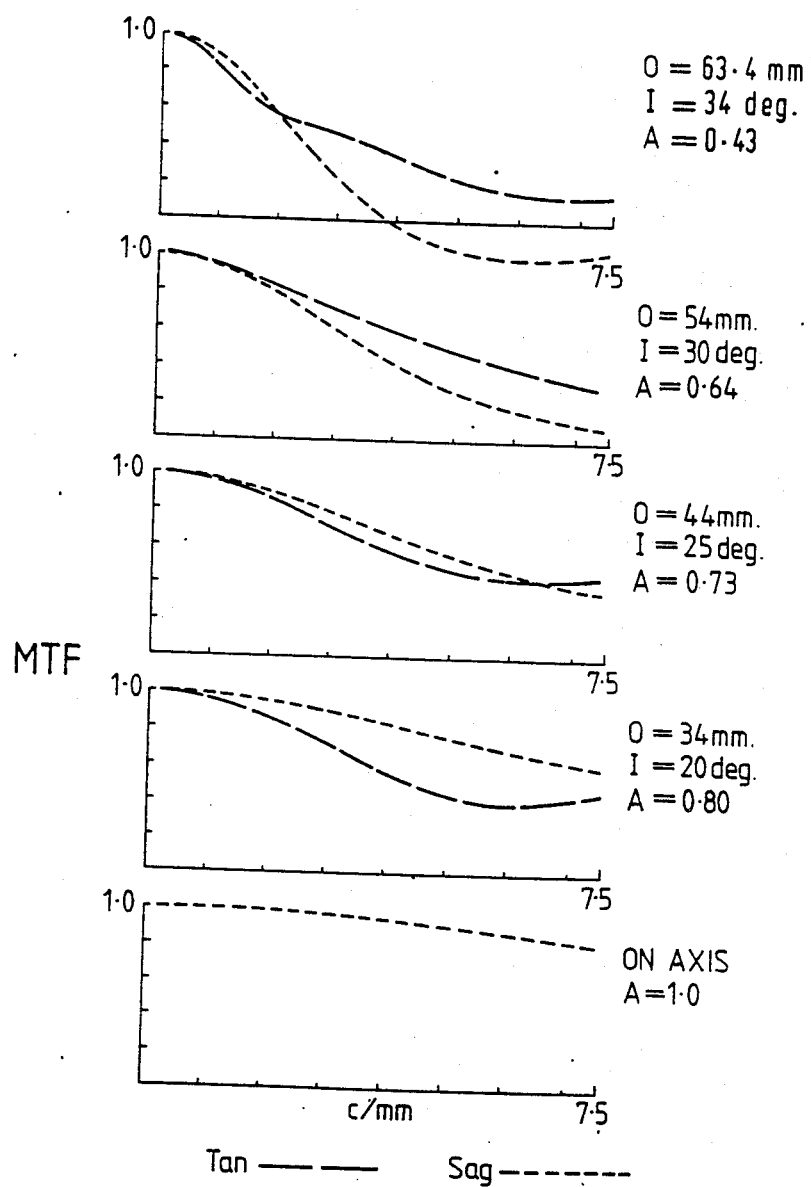
Figure 8:
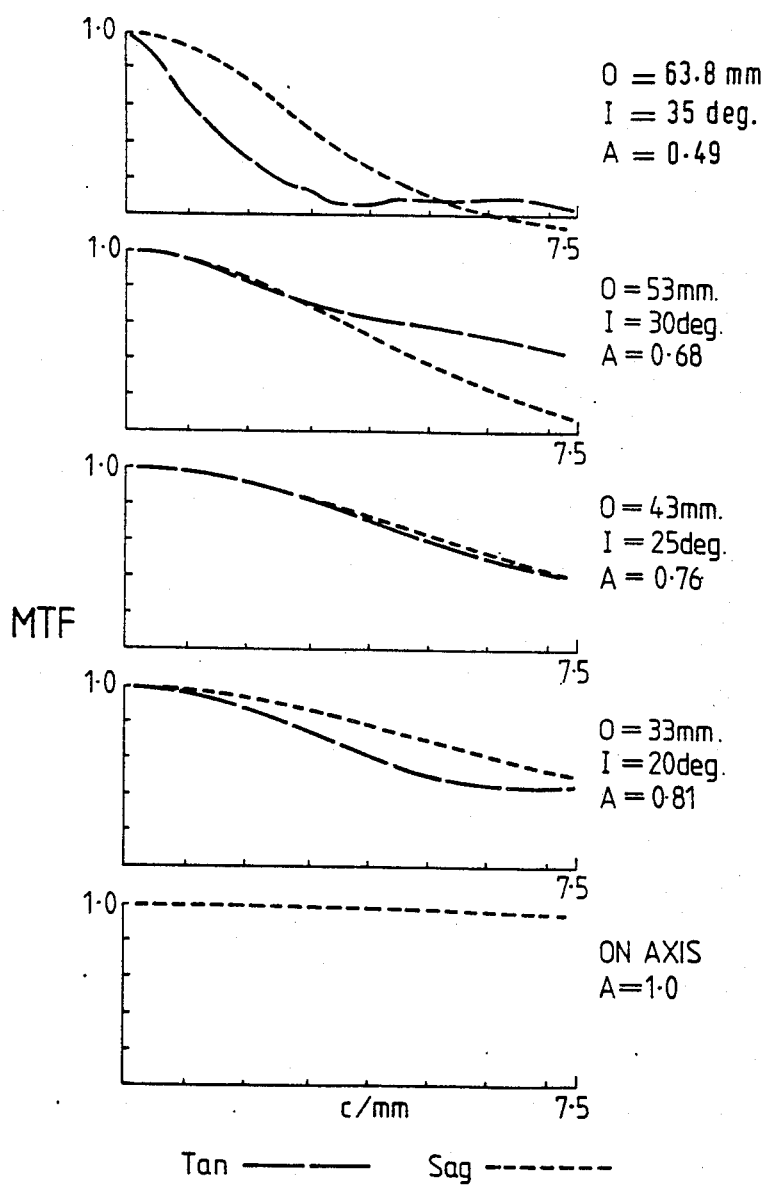
Figure 9:
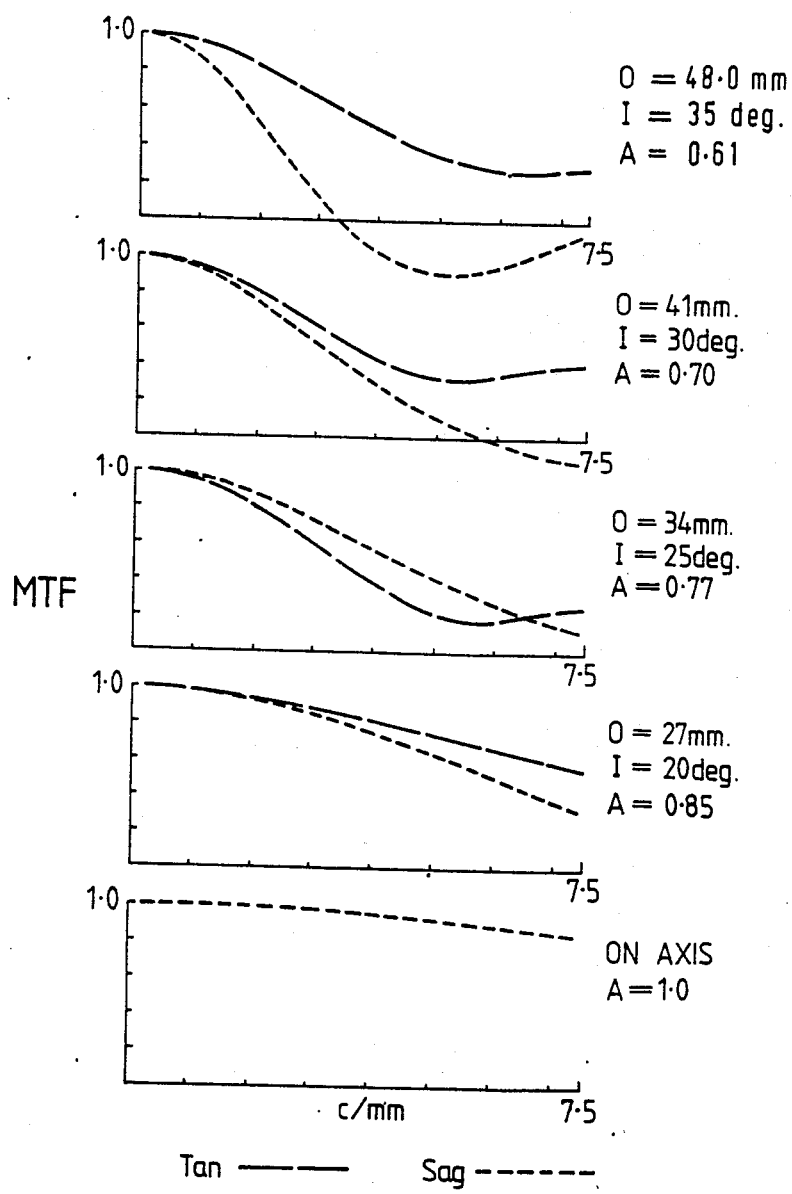

FIGS. 2 to 5 show different examples of the projection lens 3, designed with different types of cathode ray tubes. FIGS. 2 and 3 show lenses for use with CRTs having flat faceplates, while FIGS. 4 and 5 show lenses for use with CRTS having a shallow convex surface on the inside. FIGS. 2 to 4 show lenses where there is a liquid medium between element L4 and the CRT faceplate, while FIG. 5 shows a lens where element L4 is in close contact with the CRT faceplate. These lenses have adequate resolution for both normal 525 or 625 line television and also for high definition 1125 or 1249 line television. In these figures the lens elements are designated by the letter L followed by a numeral indicating the sequential position of the element from the image or translucent screen end, to the CRT faceplate end. The CRT faceplate is designated by FP. The surfaces of the elements are designated by the letter S followed by a numeral in the same sequence as the elements. Surfaces which are convex towards the translucent screen are identified by a positive radius of curvature, and surfaces which are concave towards the translucent screen are identified by a negative radius of curvature.

The paraxial powers of lens elements L1,L2,L3 and L4 are designated by K1,K2,K3 and K4 respectively and the power of the complete lens by K. The invention is charactersied by the relative powers of each of the lens elements. For the case of a CRT faceplate which is flat on both sides these are chosen so that $$-0.20K < K1 < +0.10K$$

$$+0.60K < K2 < +0.85K$$

$$+0.35K < K3 < +0.55K$$

$$-1.20K < K4 < +0.90K$$

The case where the CRT faceplate has a shallow convex surface of radius R on the inside will now be considered. Since the light emitting phosphor is deposited directly on to the convex interior surface of the CRT faceplate, the object field as seen by the lens will also have a radius of curvature R equal to the radius of curvature of the CRT faceplate. The field curvature so introduced results in less negative power being needed in the lens system. The numerical value of the reduction in power may be calculated as follows.

If a lens elements is made of a material with refractive index n and has radii of curvature R1 and R2 on its two faces, then the contribution of the lens to the total field curvature in the system is given by $$\frac{(n-1)}{n}\left(\frac{1}{R1} + \frac{1}{R2}\right).$$

If the thickness of the lens element is not great then the power K of the lens element is given approximately by $$(n-1)\left(\frac{1}{R1} + \frac{1}{R2}\right).$$

Thus the contribution of a thin lens element to the total field curvature is approximately K/n. Thus if a field curvature P is introduced at the CRT faceplate then an increase in power of nP is required somewhere in the lens system. This extra power may be added to any of the four elements in the lens system or it may be split between two or more elements. It has been found advantageous however to add the extra power to either element L1 or element L4. The powers in the inequalities therefore need to be adjusted accordingly by an appropriate numerical value depending on the amount of curvature on the CRT faceplate.

In the examples of FIGS. 4 and 5, the radius of curvature of the CRT faceplate is 600 mm. The extra field curvature is therefore 0.0016667 mm$^{-1}$. Since the lens elements have refractive indices of 1.5727, the change in power required is 0.00262 mm$^{-1}$. The power of the lens system in FIG. 4 is 0.013 mm$^{-1}$ so the relative change in power is 0.2. If this power is added to element L1 then $$0.00K < K1 < +0.30K$$

If the power is added to element L4 then $$-1.00K < K4 < -0.70K$$

The ranges of K1 or K4 individually and separate from the CRT faceplate are shifted towards less negative powers, their effective powers taken with the effect due to the curvature on the CRT faceplate remaining within the scope of the invention.

Each of the lens elements may have spherical surfaces on both sides, or an aspherical surface on one side, or aspherical surfaces on both sides. In the preferred embodiment elements L1, L3 and L4 have an aspherical surface on one side while element L2 has spherical surfaces on both sides, although acceptable performance can be obtained if element L2 has an aspheric surface and element L3 has only spherical surfaces. The choice of which side of the elements is best for the aspherical surface depends on the manufacturing method and also such considerations as the chance of the surface being damaged if it is on the outside of the lens. In general it is possible to put aspheric surfaces on both sides of a lens element but this is not recommended as it increases the cost of manufacture. The aspherical surfaces are defined by the following relationship:

$$Z = \frac{Cs^2}{1 + \sqrt{1 - eC^2s^2}} + a_4s^4 + a_6s^6 + a_8s^8 + a_{10}s^{10}$$

where Z is the deviation, in the axial direction, of the surface from a plane normal to the optical axis and tangential to the surface at its pole for a zone of the surface which is at a distance s from the axis, C is the curvature of the surface at its pole, e is a conic constant, and $a_4$, $a_6$, $a_8$, $a_{10}$ are constants for the surface.

The following Tables I to IV give the detailed design of the embodiments of FIGS. 2 to 5 respectively.

TABLE I

| Focal length 77.3 mm. | | Relative aperture F/1.05 | |
| Projection angle ±35.0 deg | | Throw distance 750 mm. | |
| Wavelength 525 nm. | | Magnification 8.3× | |

| | Polar radius mm | Axial thickness mm | Axial separation mm | Refractive index |
|---|---|---|---|---|
| L1 | S1  344.1 | | | |
| | | 5.00 | | 1.5727 |
| | S2  182.9 | | | |

TABLE I-continued

Focal length 77.3 mm.  
Projection angle ±35.0 deg  
Wavelength 525 nm.  
Relative aperture F/1.05  
Throw distance 750 mm.  
Magnification 8.3×

|    |     | Polar radius | Axial thickness | Axial separation | Refractive index |
|----|-----|---|---|---|---|
|    | S3  | 97.9 |       | 21.17 |        |
| L2 |     |      | 25.00 |       | 1.5727 |
|    | S4  | −115.8 |     | 20.12 |        |
|    | S5  | −405.4 |     |       |        |
| L3 |     |      | 15.00 |       | 1.5727 |
|    | S6  | −81.1  |     | 52.17 |        |
|    | S7  | −42.4  |     |       |        |
| L4 |     |      | 5.00  |       | 1.5727 |
|    | S8  | plane  |     | 3.00  | 1.41   |
|    | S9  | plane  |     |       |        |
| FP |     |      | 7.00  |       | 1.5727 |
|    | S10 | plane  |     |       |        |

Aspheric surfaces: S2, S5, S7

|       | S2                    | S5                     | S7                     |
|-------|-----------------------|------------------------|------------------------|
| C     | .005467               | −.002467               | −.02358                |
| e     | 1.0                   | 1.0                    | .7077                  |
| $a_4$ | $.9202 \times 10^{-6}$  | $−.6885 \times 10^{-6}$  | 0                      |
| $a_6$ | $.1721 \times 10^{-9}$  | $.2341 \times 10^{-9}$   | $−.6617 \times 10^{-11}$ |
| $a_8$ | $.1171 \times 10^{-12}$ | $−.1874 \times 10^{-12}$ | $.1255 \times 10^{-12}$  |
| $a_{10}$ | $−.2858 \times 10^{-16}$ | $.2493 \times 10^{-16}$ | 0                    |

Element values

|              | Focal length, mm | Power, $mm^{-1}$ | Relative power |
|--------------|------------------|------------------|----------------|
| L1 + L2 + L3 + L4 | 77.3        | .0129            | 1.0            |
| L1           | −689.7           | −.0014           | −0.112         |
| L2           | 96.7             | .0103            | 0.799          |
| L3           | 174.1            | .0057            | 0.444          |
| L4           | −74.0            | −.0135           | −1.044         |

TABLE II

Focal length 77.1 mm.  
Projection angle ±35.0 deg  
Wavelength 525 nm.  
Relative aperture F/1.05  
Throw distance 800 mm.  
Magnification 9×

|    |     | Polar radius mm | Axial thickness mm | Axial separation mm | Refractive index |
|----|-----|---|---|---|---|
|    | S1  | 109.7 |       |       |        |
| L1 |     |       | 5.00  |       | 1.5727 |
|    | S2  | 127.5 |       | 29.17 |        |
|    | S3  | 82.7  |       |       |        |
| L2 |     |       | 25.00 |       | 1.5727 |
|    | S4  | −140.9 |      | 18.67 |        |
|    | S5  | −237.0 |      |       |        |
| L3 |     |       | 15.00 |       | 1.5727 |
|    | S6  | −80.8  |      | 40.22 |        |
|    | S7  | −39.6  |      |       |        |
| L4 |     |       | 5.00  |       | 1.5727 |
|    | S8  | plane  |      | 3.00  | 1.41   |
|    | S9  | plane  |      |       |        |
| FP |     |       | 7.00  |       | 1.5727 |
|    | S10 | plane  |      |       |        |

Aspheric surfaces: S2, S5, S7

|       | S2                    | S5                     | S7                     |
|-------|-----------------------|------------------------|------------------------|
| C     | .007846               | −.004219               | −.02525                |
| e     | 1.0                   | 1.0                    | .7342                  |
| $a_4$ | $.7386 \times 10^{-6}$  | $−.9516 \times 10^{-6}$  | 0                      |
| $a_6$ | $−.5913 \times 10^{-10}$ | $.6112 \times 10^{-10}$ | $.3170 \times 10^{-9}$  |
| $a_8$ | $.1810 \times 10^{-12}$ | $−.9999 \times 10^{-13}$ | $−.8563 \times 10^{-14}$ |
| $a_{10}$ | $−.3082 \times 10^{-16}$ | $.1001 \times 10^{-16}$ | 0                    |

Element values

|              | Focal length, mm | Power, $mm^{-1}$ | Relative power |
|--------------|------------------|------------------|----------------|
| L1 + L2 + L3 + L4 | 77.1        | .0129            | 1.0            |

TABLE II-continued

Focal length 77.1 mm.  
Projection angle ±35.0 deg  
Wavelength 525 nm.  
Relative aperture F/1.05  
Throw distance 800 mm.  
Magnification 9×

|    |        |        |        |
|----|--------|--------|--------|
| L1 | 1243.8 | .0008  | 0.062  |
| L2 | 94.8   | .0105  | 0.813  |
| L3 | 207.0  | .0048  | 0.372  |
| L4 | −69.1  | −.0145 | −1.115 |

TABLE III

Focal length 78.4 mm.  
Projection angle ±35.0 deg  
Wavelength 525 nm.  
Relative aperture F/1.05  
Throw distance 800 mm.  
Magnification 9×.

|    |     | Polar radius mm | Axial thickness mm | Axial separation mm | Refractive index |
|----|-----|---|---|---|---|
|    | S1  | 98.1 |       |       |        |
| L1 |     |      | 5.00  |       | 1.5727 |
|    | S2  | 131.7 |      | 29.88 |        |
|    | S3  | 83.7  |      |       |        |
| L2 |     |      | 25.00 |       | 1.5727 |
|    | S4  | −141.3 |     | 24.64 |        |
|    | S5  | −400.4 |     |       |        |
| L3 |     |      | 15.00 |       | 1.5727 |
|    | S6  | −91.4  |     | 30.81 |        |
|    | S7  | −42.5  |     |       |        |
| L4 |     |      | 5.00  |       | 1.5727 |
|    | S8  | plane  |     | 3.00  | 1.41   |
|    | S9  | plane  |     |       |        |
| FP |     |      | 8.00  |       | 1.5200 |
|    | S10 | −600.0 |     |       |        |

Aspheric surfaces: S2, S5, S7

|       | S2                    | S5                     | S7                     |
|-------|-----------------------|------------------------|------------------------|
| C     | .007590               | −.01094                | −.02354                |
| e     | 1.0                   | 1.0                    | .7403                  |
| $a_4$ | $.6416 \times 10^{-6}$  | $−.1086 \times 10^{-5}$  | 0                      |
| $a_6$ | $−.1043 \times 10^{-10}$ | $.1292 \times 10^{-9}$  | $.1022 \times 10^{-8}$  |
| $a_8$ | $.1096 \times 10^{-12}$ | $−.1605 \times 10^{-12}$ | $−.4085 \times 10^{-12}$ |
| $a_{10}$ | $−.1379 \times 10^{-16}$ | $.2513 \times 10^{-16}$ | 0                    |

Element values

|              | Focal length, mm | Power, $mm^{-1}$ | Relative power |
|--------------|------------------|------------------|----------------|
| L1 + L2 + L3 + L4 | 78.4        | .0128            | 1.0            |
| L1           | 635.9            | .0016            | 0.123          |
| L2           | 95.6             | .0105            | 0.820          |
| L3           | 203.1            | .0049            | 0.386          |
| L4           | −74.1            | −.0135           | −1.057         |

TABLE IV

Focal length 65.5 mm.  
Projection angle ±35.0 deg  
Wavelength 525 nm.  
Relative aperture F/1.05  
Throw distance 684 mm.  
Magnification 9.25×

|    |     | Polar radius mm | Axial thickness mm | Axial separation mm | Refractive index |
|----|-----|---|---|---|---|
|    | S1  | 151.8 |       |       |        |
| L1 |     |       | 3.00  |       | 1.5727 |
|    | S2  | 146.6 |       | 22.23 |        |
|    | S3  | 89.3  |       |       |        |
| L2 |     |       | 26.66 |       | 1.5727 |
|    | S4  | −129.3 |      | 4.23  |        |
|    | S5  | −509.5 |      |       |        |
| L3 |     |       | 29.29 |       | 1.5727 |
|    | S6  | −86.6  |      | 41.38 |        |
|    | S7  | −38.2  |      |       |        |
| L4 |     |       | 5.00  |       | 1.5727 |
|    | S8  | plane  |      |       |        |

TABLE IV-continued

| Focal length 65.5 mm. | Relative aperture F/1.05 |
|---|---|
| Projection angle ±35.0 deg | Throw distance 684 mm. |
| Wavelength 525 nm. | Magnification 9.25× |

| | | 0.00 | |
|---|---|---|---|
| | S9 plane | | |
| FP | | 6.00 | 1.5200 |
| | S10 −600.0 | | |

| Aspheric surfaces: S2, S5, S7 | | | |
|---|---|---|---|
| | S2 | S5 | S7 |
| C | .006823 | .001963 | −.02615 |
| e | 1.0 | 1.0 | .7744 |
| $a_4$ | $.9862 \times 10^{-6}$ | $-.4952 \times 10^{-6}$ | 0 |
| $a_6$ | $.3505 \times 10^{-9}$ | $-.1777 \times 10^{-11}$ | $-.6854 \times 10^{-9}$ |
| $a_8$ | $.1398 \times 10^{-13}$ | $-.6372 \times 10^{-13}$ | $.1054 \times 10^{-11}$ |
| $a_{10}$ | 0 | 0 | 0 |

| Element values | | | |
|---|---|---|---|
| | Focal length, mm | Power, mm$^{-1}$ | Relative power |
| L1 + L2 + L3 + L4 | 65.5 | .0152 | 1.0 |
| L1 | −9321. | −.0001 | −0.007 |
| L2 | 96.5 | .0104 | 0.679 |
| L3 | 131.6 | .0076 | 0.498 |
| L4 | −66.8 | −.0150 | −0.981 |

FIGS. 6 to 9 show the performance of the lenses of FIGS. 2 to 5 respectively. The five graphs in each figure show the modulation transfer functions (MTF) plotted vertically as a function of spatial frequency for both the tangential (Tan) and sagittal (Sag) directions. Each graph is for a different position in the projected image, indicated by the object height, 0, on the CRT faceplate, and also by the image projection angle I, on the viewing screen side of the lens, measured relative to the optical axis. For each off-axis position the effective geometrical pupil aperture area A is given relative to the value on axis. The MTFs are plotted out to 7.5 cycles per mm on the CRT faceplate.

I claim:

1. A lens system for projecting an enlarged image of an object surface onto a planar display screen, characterised in that the projection lens comprises first from the display screen a first element L1 of low power relative to the power of the whole lens and, in succession from the first element to the object surface, second, third and fourth elements L2, L3, and L4 respectively, L2 and L3 being of positive power and L4 being of negative power, the powers K1, K2, K3 and K4 of the respective elements being chosen relative to the power K of the whole lens so that $$-0.20K < K1 < +0.10K$$

$$+0.60K < K2 < +0.85K$$

$$+0.35K < K3 < +0.55K$$

$$-1.20K < K4 < -0.90K$$

and at least two of the element surfaces being aspheric.

2. A lens system as claimed in claim 1, characterised in that three of the element surfaces are aspheric.

3. A lens system as claimed in claim 1 or claim 2, characterised in that each aspheric surface is defined by the following relationship:

$$Z = \frac{Cs^2}{1 + \sqrt{1 - eC^2s^2}} + a_4s^4 + a_6s^6 + a_8s^8 + a_{10}s^{10}$$

where Z is the deviation, in the axial direction, of the surface from a plane normal to the optic axis and tangent to the surface at its pole for a zone of the surface which is at a distance s from the axis, C is the curvature of the surface on the axis, e is a conic constant, and $a_4$, $a_6$, $a_8$ and $a_{10}$ are constants for the surface.

4. A lens system as claimed in claim 3, characterised in that the lens is combined with a cathode ray tube face plate FP for projecting a faceplate raster onto the screen, the lens system parameters being as follows:

| Focal length 77.3 mm. | Relative aperture F/1.05 |
|---|---|
| Projection angle ±35.0 deg | Throw distance 750 mm. |
| Wavelength 525 nm. | Magnification 8.3× |

| | Polar radius mm | Axial thickness mm | Axial separation mm | Refractive index |
|---|---|---|---|---|
| | S1 344.1 | | | |
| L1 | | 5.00 | | 1.5727 |
| | S2 182.9 | | | |
| | | | 21.17 | |
| | S3 97.9 | | | |
| L2 | | 25.00 | | 1.5727 |
| | S4 −115.8 | | | |
| | | | 20.12 | |
| | S5 −405.4 | | | |
| L3 | | 15.00 | | 1.5727 |
| | S6 −81.1 | | | |
| | | | 52.17 | |
| | S7 −42.4 | | | |
| L4 | | 5.00 | | 1.5727 |
| | S8 plane | | | |
| | | | 3.00 | 1.41 |
| | S9 plane | | | |
| FP | | 7.00 | | 1.5727 |
| | S10 plane | | | |

| Aspheric surfaces: S2, S5, S7 | | | |
|---|---|---|---|
| | S2 | S5 | S7 |
| C | .005467 | −.002467 | −.02358 |
| e | 1.0 | 1.0 | .7077 |
| $a_4$ | $.9202 \times 10^{-6}$ | $-.6885 \times 10^{-6}$ | 0 |
| $a_6$ | $.1721 \times 10^{-9}$ | $.2341 \times 10^{-9}$ | $-.6617 \times 10^{-11}$ |
| $a_8$ | $.1171 \times 10^{-12}$ | $-.1874 \times 10^{-12}$ | $.1255 \times 10^{-12}$ |
| $a_{10}$ | $-.2858 \times 10^{-16}$ | $.2493 \times 10^{-16}$ | 0 |

| Element values | | | |
|---|---|---|---|
| | Focal length, mm | Power, mm$^{-1}$ | Relative power |
| L1 + L2 + L3 + L4 | 77.3 | .0129 | 1.0 |
| L1 | −689.7 | −.0014 | −0.112 |
| L2 | 96.7 | .0103 | 0.799 |
| L3 | 174.1 | .0057 | 0.444 |
| L4 | −74.0 | −.0135 | −1.044 | where L1, L2, L3 and L4 are successive lens elements from the screen end and S1 to S10 inclusive are successive element surfaces, positive surfaces being convex towards the screen end and negative surfaces being concave towards the screen end.

5. A lens system as claimed in claim 3, characterised in that the lens in combined with a cathode ray tube faceplate FP for projecting a faceplate raster onto the screen, the lens system parameters being as follows:

| Focal length 77.1 mm. | Relative aperture F/1.05 |
|---|---|
| Projection angle ±35.0 deg | Throw distance 800 mm. |
| Wavelength 525 nm. | Magnification 9× |

| | Polar radius mm | Axial thickness mm | Axial separation mm | Refractive index |
|---|---|---|---|---|
| | S1 109.7 | | | |
| L1 | | 5.00 | | 1.5727 |
| | S2 127.5 | | | |

-continued

| Focal length 77.1 mm. | Relative aperture F/1.05 |
| Projection angle ±35.0 deg | Throw distance 800 mm. |
| Wavelength 525 nm. | Magnification 9× |

|    |    |       | 29.17 |        |
|----|----|-------|-------|--------|
|    | S3 | 82.7  |       |        |
| L2 |    |       | 25.00 | 1.5727 |
|    | S4 | −140.9|       |        |
|    |    |       | 18.67 |        |
|    | S5 | −237.0|       |        |
| L3 |    |       | 15.00 | 1.5727 |
|    | S6 | −80.8 |       |        |
|    |    |       | 40.22 |        |
|    | S7 | −39.6 |       |        |
| L4 |    |       | 5.00  | 1.5727 |
|    | S8 | plane |       |        |
|    |    |       | 3.00  | 1.41   |
|    | S9 | plane |       |        |
| FP |    |       | 7.00  | 1.5727 |
|    | S10| plane |       |        |

| Aspheric surfaces: S2, S5, S7 | | |
|---|---|---|
|  | S2 | S5 | S7 |
| C | .007846 | −.004219 | −.02525 |
| e | 1.0 | 1.0 | .7342 |
| $a_4$ | $.7386 \times 10^{-6}$ | $-.9516 \times 10^{-6}$ | 0 |
| $a_6$ | $-.5913 \times 10^{-10}$ | $.6112 \times 10^{-10}$ | $.3170 \times 10^{-9}$ |
| $a_8$ | $.1810 \times 10^{-12}$ | $-.9999 \times 10^{-13}$ | $-.8563 \times 10^{-14}$ |
| $a_{10}$ | $-.3082 \times 10^{-16}$ | $.1001 \times 10^{-16}$ | 0 |

| Element values | | |
|---|---|---|
|  | Focal length, mm | Power, mm$^{-1}$ | Relative power |
| L1 + L2 + L3 + L4 | 77.1 | .0129 | 1.0 |
| L1 | 1243.8 | .0008 | 0.062 |
| L2 | 94.8 | .0105 | 0.813 |
| L3 | 207.0 | .0048 | 0.372 |
| L4 | −69.1 | −.0145 | −1.115 | where L1, L2, L3 and L4 are successive lens elements from the screen end and S1 to S10 inclusive are successive element surfaces, positive surfaces being convex towards the screen end and negative surfaces being concave towards the screen end.

6. A lens system as claimed in claim 3, characterised in that the lens is combined with a cathode ray tube faceplate FP for projecting a faceplate raster onton the screen, the lens system parameters being as follows:

| Focal length 78.4 mm. | Relative aperture F/1.05 |
| Projection angle ±35.0 deg | Throw distance 800 mm. |
| Wavelength 525 nm. | Magnification 9× |

|    | Polar radius mm | Axial thickness mm | Axial separation mm | Refractive index |
|----|-----------------|--------------------|--------------------|------------------|
|    | S1  98.1        |                    |                    |                  |
| L1 |                 | 5.00               |                    | 1.5727           |
|    | S2  131.7       |                    |                    |                  |
|    |                 |                    | 29.88              |                  |
|    | S3  83.7        |                    |                    |                  |
| L2 |                 | 25.00              |                    | 1.5727           |
|    | S4 −141.3       |                    |                    |                  |
|    |                 |                    | 24.64              |                  |
|    | S5 −400.4       |                    |                    |                  |
| L3 |                 | 15.00              |                    | 1.5727           |
|    | S6 −91.4        |                    |                    |                  |
|    |                 |                    | 30.81              |                  |
|    | S7 −42.5        |                    |                    |                  |
| L4 |                 | 5.00               |                    | 1.5727           |
|    | S8  plane       |                    |                    |                  |
|    |                 |                    | 3.00               | 1.41             |
|    | S9  plane       |                    |                    |                  |
| FP |                 | 8.00               |                    | 1.5200           |
|    | S10 −600.0      |                    |                    |                  |

| Aspheric surfaces: S2, S5, S7 | | |
|---|---|---|
|  | S2 | S5 | S7 |
| C | .007590 | −.01094 | −.02354 |
| e | 1.0 | 1.0 | .7403 |
| $a_4$ | $.6416 \times 10^{-6}$ | $-.1086 \times 10^{-5}$ | 0 |
| $a_6$ | $-.1043 \times 10^{-10}$ | $.1292 \times 10^{-9}$ | $.1022 \times 10^{-8}$ |
| $a_8$ | $.1096 \times 10^{-12}$ | $-.1605 \times 10^{-12}$ | $-.4085 \times 10^{-12}$ |
| $a_{10}$ | $-.1379 \times 10^{-16}$ | $.2513 \times 10^{-16}$ | 0 |

| Element values | | |
|---|---|---|
|  | Focal length, mm | Power, mm$^{-1}$ | Relative power |
| L1 + L2 + L3 + L4 | 78.4 | .0128 | 1.0 |
| L1 | 635.9 | .0016 | 0.123 |
| L2 | 95.6 | .0105 | 0.820 |
| L3 | 203.1 | .0049 | 0.386 |
| L4 | −74.1 | −.0135 | −1.057 | where L1, L2, L3 and L4 are successive lens elements from the screen end and S1 to S10 inclusive are successive element surfaces, positive surfaces being convex towards the screen end and negative surfaces being concave towards the screen end.

7. A lens system as claimed in claim 3, characterised in that the lens is combined with a cathode ray tube faceplate FP for projecting a faceplate raster onto the screen, the lens system parameters being as follows:

| Focal length 65.5 mm. | Relative aperture F/1.05 |
| Projection angle ±35.0 deg | Throw distance 684 mm. |
| Wavelength 525 nm. | Magnification 9.25× |

|    | Polar radius mm | Axial thickness mm | Axial separation mm | Refractive index |
|----|-----------------|--------------------|--------------------|------------------|
|    | S1  151.8       |                    |                    |                  |
| L1 |                 | 3.00               |                    | 1.5727           |
|    | S2  146.6       |                    |                    |                  |
|    |                 |                    | 22.23              |                  |
|    | S3  89.3        |                    |                    |                  |
| L2 |                 | 26.66              |                    | 1.5727           |
|    | S4 −129.3       |                    |                    |                  |
|    |                 |                    | 4.23               |                  |
|    | S5 −509.5       |                    |                    |                  |
| L3 |                 | 29.29              |                    | 1.5727           |
|    | S6 −86.6        |                    |                    |                  |
|    |                 |                    | 41.38              |                  |
|    | S7 −38.2        |                    |                    |                  |
| L4 |                 | 5.00               |                    | 1.5727           |
|    | S8  plane       |                    |                    |                  |
|    |                 |                    | 0.00               |                  |
|    | S9  plane       |                    |                    |                  |
| FP |                 | 6.00               |                    | 1.5200           |
|    | S10 −600.0      |                    |                    |                  |

| Aspheric surfaces: S2, S5, S7 | | |
|---|---|---|
|  | S2 | S5 | S7 |
| C | .006823  .001963 | −.02615 | |
| e | 1.0 | 1.0 | .7744 |
| $a_4$ | $.9862 \times 10^{-6}$ | $-.4952 \times 10^{-6}$ | 0 |
| $a_6$ | $.3505 \times 10^{-9}$ | $-.1777 \times 10^{-11}$ | $-.6854 \times 10^{-9}$ |
| $a_8$ | $.1398 \times 10^{-13}$ | $-.6372 \times 10^{-13}$ | $.1054 \times 10^{-11}$ |
| $a_{10}$ | 0 | 0 | 0 |

| Element values | | |
|---|---|---|
|  | Focal length, mm | Power, mm$^{-1}$ | Relative power |
| L1 + L2 + L3 + L4 | 65.5 | .0152 | 1.0 |
| L1 | −9321. | −.0001 | −0.007 |
| L2 | 96.5 | .0104 | 0.679 |
| L3 | 131.6 | .0076 | 0.498 |
| L4 | −66.8 | −.0150 | −0.981 | where L1, L2, L3 and L4 are successive lens elements from the screen end and S1 to S10 inclusive are successive element surfaces, positive surfaces being convex towards the screen end and negative surfaces concave towards the screen end.

* * * * *

UNITED STATES PATENT AND TRADEMARK OFFICE
CERTIFICATE OF CORRECTION

PATENT NO. : 4,699,476

DATED : October 13, 1987

INVENTOR(S) : John A. Clarke

It is certified that error appears in the above-identified patent and that said Letters Patent is hereby corrected as shown below:

IN THE CLAIMS

Column 10, line 50, only ".006823" should appear under the "S2" column, line 50, only ".001963" should appear under the "S5" column, line 50, "-.02615" should appear under the "S7" column.

Signed and Sealed this

Sixth Day of December, 1988

Attest:

DONALD J. QUIGG

Attesting Officer

Commissioner of Patents and Trademarks